Sept. 2, 1941.    A. RONNING    2,254,452
VEHICLE WHEEL MOUNTING
Original Filed March 2, 1939
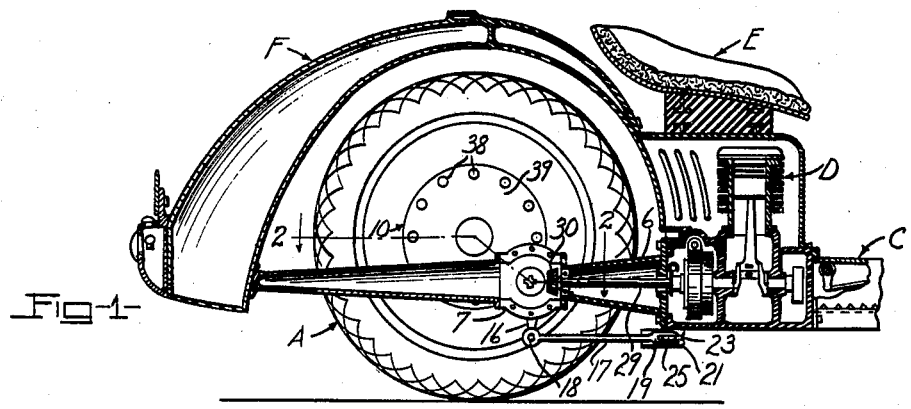
Fig-1-
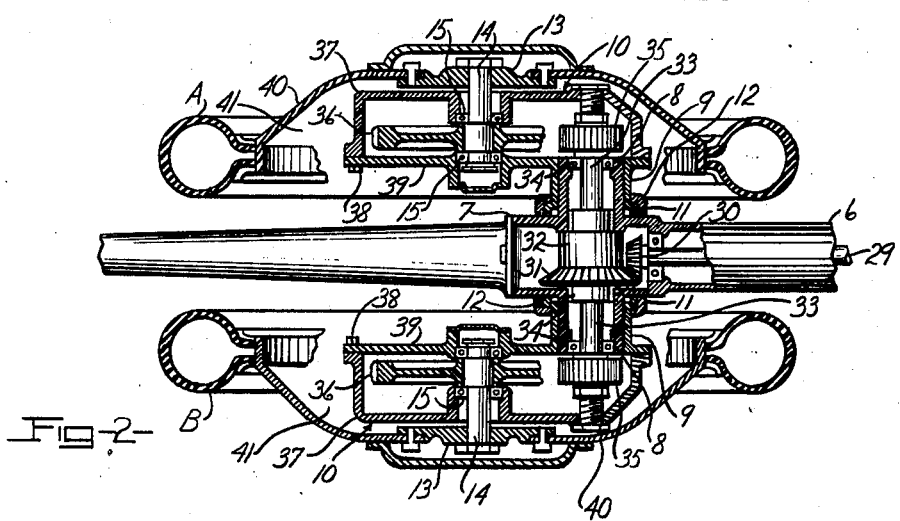
Fig-2-
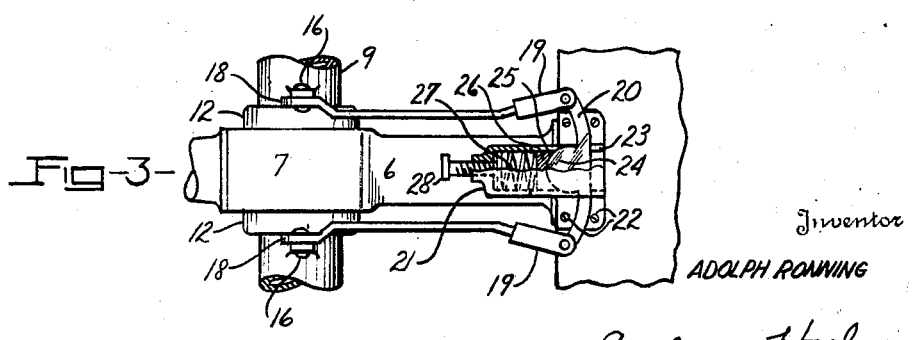
Fig-3-
Inventor
ADOLPH RONNING
Carlsen + Hagle
Attorneys Patented Sept. 2, 1941

2,254,452

UNITED STATES PATENT OFFICE 2,254,452

VEHICLE WHEEL MOUNTING

Adolph Ronning, Minneapolis, Minn.

Original application March 2, 1939, Serial No. 259,361. Divided and this application April 18, 1940, Serial No. 330,344

7 Claims. (Cl. 280—104)

This invention relates to improvements in wheel suspension for vehicles, and the primary object is to provide means for supporting relatively close spaced vehicle wheels for differential up and down movements to compensate for inequalities in the ground on which they travel, and to provide means for power operating or driving the wheels without interference with their differential action. Another object is to provide a wheel suspension and driving means of a novel, compact and practical form and with most all working parts suitably enclosed and protected from dust and other foreign matter.

These and other more detailed and specific objects will be disclosed in the course of the following specification, reference being had to the accompanying drawing, in which—

Fig. 1 is a longitudinal vertical section through a vehicle embodying my suspension and driving means, one of the wheels being removed and the forward portion of the vehicle being broken away.

Fig. 2 is a horizontal section through the wheels, driving and suspension means and adjacent parts taken substantially along the line 2—2 in Fig. 1.

Fig. 3 is a bottom view of a rear portion of the vehicle frame and parts of the driving mechanism showing the differentially operating wheel connecting elements of my invention.

The present application is a division from my copending application for patent on a Motorcycle, Serial No. 259,361, filed March 2, 1939.

My invention as exemplified herein is applicable to any type of vehicle where close spaced, power driven and differentially operable wheels may be required or desired, but is shown for example, and in order to preserve continuity with the parent application, as employed in connection with the rear wheels A and B of my improved motorcycle. This motorcycle, details as to the construction of which may be found in the prior application, includes a frame C supporting adjacent its rear end a power unit D over which is arranged the operator's seat E, and a rear fender F supported over the wheels A and B.

The frame C includes as rigid parts the rearwardly directed tubular housing member 6 and the differential or gear housing 7 secured at the rear end thereof. This housing 6 has laterally extended and transversely aligned, rigid, tubular bearing members or necks 8 at each side, and the tubular bearing collars or ends 9 of right and left hand crank acting members or wheel mounting members 10 are journaled on these necks to thus oscillate up and down at their rearwardly turned ends. The flanged inner ends 11 of the collars 9 are rotatably received in clamp rings 12 which are secured to the sides of housing 7 to restrain the telescoped bearing parts from outward displacement.

The wheels A and B are secured by their hub members 13 to outer ends of spindles 14 which are journaled in anti-friction bearings 15 on transverse axes in the rear end portions of the crank acting members 10 to thus support these members and the rear end of the vehicle frame.

An equalizing or differential mechanism is connected between the wheels and includes arms 16 rigidly secured to the collars or bearing ends 9 of the crank acting members 10 and radially extended therefrom. Equalizing rods 17 are pivotally connected at rear ends 18 to the arms 16 and at their forwardly extending ends 19 are pivotally connected to a cross member or tie member 20 which is oscillatably supported for back and forth movement at its ends. A tubular bracket member 21 is rigidly secured at 22 to the frame C and is slotted at diametrically opposed points as designated at 23 to receive the cross member 20 which at its center has the rounded portion 24 received in the concaved end 25 of a block 26. Said block 26 is slidably mounted in the bore of the bracket member 21 and is braced against the forward end of an expansion coil spring 27 therein. A screw 28 is threaded through the rear end of the bracket member to bear against the spring 27 and permit the convenient adjustment of the force with which the spring urges the cross member 20 forwardly as will be evident.

Normally, in travel over a smooth, level terrain, the wheels A and B will of course operate in substantial alignment with each other. However, as either wheel meets a rise or dip in the surface it may move upwardly or downwardly as the case may be and the resulting shifting of the equalizing rods 17 through the arm 16 and cross member 20 will move the other wheel in a vertical plane to an equal extent, but in the opposite direction. In this operation the members 10 of course swing up and down about the bearing connections 8 and 9 with the housing 7. There results therefore a continuous, automatic differential up and down play of the wheels such that they will maintain constant equal ground contact and with the load of the vehicle equally distributed at all times.

The spring 27 cushions sudden shocks which may occur as the wheels meet variations in the ground in their path, and as will be readily evident prevents the transmission of such shocks to the frame.

The power unit D drives the propeller shaft 29 which extends rearwardly through member 6 into the gear housing 7 and therewithin carries a drive pinion 30 which meshes with the drive gear 31 of a conventional differential mechanism 32. Axles or driving members 33 extend outwardly from the mechanism 32 and are supported for rotation coaxially with respect to the bearing members 8 and 9 by anti-friction bearings 34. At outer ends these axles 33 are provided with pinions 35 which mesh with wheel operating gears 36 fixed on the spindles 14 carrying the wheels A and B.

The crank acting members 10 take the form of hollow housings having outer castings 37 removably secured by cap screws 38 to inner plates 39 and the shape and dimensions of these parts are such that the pinions 35, gears 36, and associated parts are all contained and protected within the said members. These parts may thus run in oil if desired, and of course are entirely protected from the effects of dust, dirt, and like foreign matter. Their location near the ground and within the wheels makes this protection of the parts of particular advantage, as will be evident.

In operation the rotation of the propeller shaft 29 by power unit D is transmitted through gears 30 and 31 to the axles 33 and thence through the pinions 35 and gears 36 to the wheels A and B causing travel movement of the vehicle, the differential mechanism 32 providing for the usual relative rotation of the wheels as may be required. This power transmission to the wheels will take place with equal facility in any relative up and down positions thereof, as brought about by their self adjusting action hereinbefore described, due to the fact that the axes of the driving parts are coincident with the axes about which the wheel supporting members swing in their differential movements.

The wheels A and B have their center disks 40 dished outwardly as clearly shown in Fig. 2, and this formation not only provides strength but also provides inner concavities 41 in which the crank members 10 may operate, thus making it possible to place the wheels very close together at opposite sides of the frame.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicle wheel mounting comprising a frame, a pair of wheels, a pair of crank members having spindles for carrying the vehicle wheels, the said crank members being pivotally connected at corresponding ends to the frame for up and down movements relative to said frame, a cross member mounted on the frame for longitudinal sliding movements and for oscillating movements at its ends toward and away from the crank members, means connected between the crank members and the ends of the cross member for differentially connecting the crank members to thereby cause relatively opposite up and down movements thereof, as the wheels travel over irregular surfaces, and means for normally and yieldably urging the cross member away from the crank members.

2. A vehicle wheel mounting comprising a frame, crank members pivotally connected to the frame for up and down movements with respect to the frame and in longitudinally extending planes, wheels carried by the cranks for up and down movements in connection therewith, a housing mounted on the frame and spaced from the pivoted ends of the crank members, a cross member mounted to the housing for longitudinal movements and for swinging movements at its ends, arms extended from the crank members adjacent their pivoted ends, link rods pivotally connected between the arms and the ends of the cross member and operative to translate an upward movement of one crank member to downward movement of the other, and a spring in the housing braced against the cross member to yieldably urge the same in a direction away from the crank members.

3. A vehicle wheel mounting comprising a frame, a pair of wheels, crank members supported by the respective wheels and pivotally connected at corresponding ends to the frame for relative up and down movements at the opposite ends, differential acting means connecting the crank members in a manner causing the wheels to move oppositely up and down as they travel over irregular surfaces, the said wheels including outwardly convexed disks forming inner concaved spaces for the reception therein of the crank members and to thereby permit the wheels to be mounted in closely spaced relation.

4. A vehicle wheel mounting comprising a frame, crank members pivotally connected to the frame and extended substantially in parallel relation therefrom for relative up and down movements about their pivotal connections, a ground wheel journaled on each crank member and disposed outwardly thereof, differential acting means connecting the crank members in a manner to cause equal opposite up and down movements thereof as the wheels travel over irregular ground surfaces, power actuated means for driving the wheels, and the said wheels having center disks outwardly and oppositely dished to form inner cavities for the reception and operation of the said crank members.

5. A wheel mounting for a vehicle comprising, a pair of arms coaxially pivoted to the vehicle at corresponding ends for movements in transversely spaced parallel planes, wheels mounted on the respective arms for movements therewith, a cross member pivotally mounted with respect to the vehicle, longitudinally extending links connecting the ends of the cross member to vertical projections of the arms, and means for creating a yieldable tension in the links to thereby cushion shocks imparted to the arms by the respective wheels.

6. A wheel mounting for a vehicle comprising, a pair of arms coaxially pivoted to the vehicle at corresponding ends for movements in transversely spaced parallel planes, wheels mounted on the respective arms for movements therewith, a cross member pivotally mounted with respect to the vehicle, longitudinally extending links connecting the ends of the cross member to vertical projections of the arms, and means for creating a yieldable tension in the links to thereby cushion shocks imparted to the arms by the respective wheels, said means including a movable bearing for the cross member.

7. A wheel mounting for a vehicle comprising, a pair of arms coaxially pivoted to the vehicle at corresponding ends for movements in transversely spaced parallel planes, wheels mounted on the respective arms for movements therewith, said wheels being outwardly dished to form inwardly opposed concave spaces for the reception therein of the wheel arms, and differential acting means connecting the arms to move them and their respective wheels in opposite vertical directions.

ADOLPH RONNING.